US008659400B2

(12) United States Patent
Arling et al.

(10) Patent No.: US 8,659,400 B2

(45) Date of Patent: Feb. 25, 2014

(54) SYSTEM AND METHOD FOR CONFIGURING THE REMOTE CONTROL FUNCTIONALITY OF A PORTABLE DEVICE

(75) Inventors: Paul D. Arling, Irvine, CA (US); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 277 days.

(21) Appl. No.: 13/198,172

(22) Filed: Aug. 4, 2011

(65) Prior Publication Data

US 2012/0200400 A1 Aug. 9, 2012

Related U.S. Application Data

(63) Continuation-in-part of application No. 13/198,072, filed on Aug. 4, 2011, and a continuation-in-part of application No. 13/026,768, filed on Feb. 14, 2011, which is a continuation of application No. 12/768,325, filed on Apr. 27, 2010, now Pat. No. 7,969,514, which is a continuation of application No. 11/515,962, filed on Sep. 5, 2006, now Pat. No. 7,907,222.

(51) Int. Cl.
*G05B 11/01* (2006.01)

(52) U.S. Cl.
USPC .................. 340/12.29; 340/12.28; 340/12.23; 340/4.32; 340/13.21; 715/716; 348/119; 348/211.6; 348/734

(58) Field of Classification Search
USPC ............... 340/12.86, 12.29, 176, 4.32, 12.25, 340/4.42, 12.23, 13.21; 715/716, 748; 348/119, 211.6, 734
See application file for complete search history.

(56) References Cited

U.S. PATENT DOCUMENTS 4,626,848 A 12/1986 Ehlers
4,746,919 A 5/1988 Reitmeier (Continued)

FOREIGN PATENT DOCUMENTS

DE 19709800.2 A1 9/1998
EP 0513443 A1 11/1992

(Continued)

OTHER PUBLICATIONS

Ingrid Wickelgren, Apr. 1997, IEEE Spectrum, vol. Apr. 1997, pp. 20-25.

(Continued)

*Primary Examiner* — Benjamin C Lee
*Assistant Examiner* — Chico A Foxx
(74) *Attorney, Agent, or Firm* — Greenberg Traurig, LLP; Gary R. Jarosik

(57) ABSTRACT

A system and method used to configure a smart device to command functional operations of a target appliance. The smart device retrieves from a controllable appliance, such as a settop box, data indicative of a codeset identity of the target appliance wherein the codeset identity was determined during a process used to configure a conventional universal remote control to command functional operations of the target appliance and wherein the process used to configure the conventional universal remote control is performed in cooperation with the controllable appliance. A remote control application resident on the smart device then uses the data indicative of the codeset identity retrieved from the controllable appliance to also configure the smart device to command functional operations of the target appliance.

20 Claims, 6 Drawing Sheets

(56) References Cited

U.S. PATENT DOCUMENTS

| | | | | |
|---|---|---|---|---|
| 5,255,313 | A | 10/1993 | Darbee | |
| 5,410,326 | A | 4/1995 | Goldstein | |
| 5,438,325 | A | 8/1995 | Nishigaki et al. | |
| 5,452,291 | A | 9/1995 | Eisenhandler et al. | |
| 5,519,457 | A | 5/1996 | Nishigaki et al. | |
| 5,537,104 | A | 7/1996 | Van Dort et al. | |
| 5,552,917 | A | 9/1996 | Darbee et al. | |
| 5,689,663 | A | 11/1997 | Williams | |
| 5,726,645 | A | 3/1998 | Kamon et al. | |
| 5,839,097 | A | 11/1998 | Klausner | |
| 5,909,183 | A | 6/1999 | Borgstahl et al. | |
| 5,949,351 | A | 9/1999 | Hahm | |
| 5,959,539 | A | 9/1999 | Adolph et al. | |
| 5,990,884 | A | 11/1999 | Douma et al. | |
| 6,133,847 | A | 10/2000 | Yang | |
| 6,148,241 | A | 11/2000 | Ludtke et al. | |
| 6,157,319 | A | 12/2000 | Johns et al. | |
| 6,160,491 | A | 12/2000 | Kitao et al. | |
| 6,567,011 | B1 * | 5/2003 | Young et al. | 340/12.28 |
| 6,748,278 | B1 | 6/2004 | Maymudes | |
| 6,781,518 | B1 | 8/2004 | Hayes et al. | |
| 6,791,467 | B1 | 9/2004 | Ben-Ze'ev | |
| 7,259,696 | B1 | 8/2007 | Lee et al. | |
| 7,271,732 | B2 | 9/2007 | Harada | |
| 7,429,932 | B1 | 9/2008 | Newell et al. | |
| 7,554,614 | B2 | 6/2009 | Satou | |
| 7,589,642 | B1 | 9/2009 | Mui | |
| 7,831,930 | B2 * | 11/2010 | Dresti et al. | 715/835 |
| 7,907,222 | B2 | 3/2011 | Haughawout et al. | |
| 7,936,287 | B1 | 5/2011 | Lee et al. | |
| 8,068,184 | B2 | 11/2011 | Hicks | |
| 8,132,105 | B1 * | 3/2012 | Dubil et al. | 715/740 |
| 2001/0043145 | A1 | 11/2001 | Jacob, Jr. | |
| 2003/0189509 | A1 * | 10/2003 | Hayes et al. | 341/176 |
| 2004/0070491 | A1 | 4/2004 | Huang et al. | |
| 2004/0143847 | A1 | 7/2004 | Suzuki et al. | |
| 2004/0266419 | A1 * | 12/2004 | Arling et al. | 455/420 |
| 2006/0200538 | A1 | 9/2006 | Yuh et al. | |
| 2007/0225828 | A1 * | 9/2007 | Huang et al. | 700/11 |
| 2008/0005764 | A1 | 1/2008 | Arling et al. | |
| 2008/0098426 | A1 | 4/2008 | Candelore | |
| 2008/0134237 | A1 | 6/2008 | Tu et al. | |
| 2008/0195857 | A1 | 8/2008 | Douillet | |
| 2008/0231762 | A1 | 9/2008 | Hardacker et al. | |
| 2009/0157198 | A1 | 6/2009 | Morikawa | |
| 2009/0239587 | A1 | 9/2009 | Negron et al. | |
| 2009/0296731 | A1 | 12/2009 | Lida et al. | |
| 2009/0298535 | A1 * | 12/2009 | Klein et al. | 455/556.1 |
| 2010/0037264 | A1 | 2/2010 | Hardacker et al. | |
| 2010/0039282 | A1 | 2/2010 | Hostage et al. | |
| 2010/0118193 | A1 | 5/2010 | Boyden et al. | |
| 2011/0018693 | A1 | 1/2011 | Lim et al. | |
| 2011/0138327 | A1 | 6/2011 | Scott et al. | |

FOREIGN PATENT DOCUMENTS

| | | | |
|---|---|---|---|
| GB | 2166328 | A | 4/1986 |
| JP | 05083765 | | 4/1998 |
| WO | 00/13344 | A1 | 3/2000 |

OTHER PUBLICATIONS

United States Patent an Trademark Office, Office Action issued on U.S. Appl. No. 13/198,072, dated Jul. 22, 2013, 22 pages.

* cited by examiner

Appliance data record

SYSTEM AND METHOD FOR CONFIGURING THE REMOTE CONTROL FUNCTIONALITY OF A PORTABLE DEVICE

RELATED APPLICATION INFORMATION

This application is a continuation-in-part and claims the benefit of U.S. patent application Ser. No. 13/198,072, filed Aug. 4, 2011. It is also a continuation-in-part and claims the benefit of U.S. patent application Ser. No. 13/026,768, filed Feb. 14, 2011, which application is a continuation of U.S. patent application Ser. No. 12/768,325, filed Apr. 27, 2010, (now U.S. Pat. No. 7,969,514), which application is a continuation of U.S. patent application Ser. No. 11/515,962, filed Sep. 5, 2006, (now U.S. Pat. No. 7,907,222). The disclosure within each of these referenced applications is incorporated herein by reference in its entirety.

BACKGROUND

Personal communication, productivity, and entertainment devices such as tablet computers, smart phones, portable email devices, e-books, hand-held games and/or game controllers, portable media players, etc. (all referred to hereafter as "smart devices") are known to include features such as graphical user interfaces on color touch screens, wireless Internet capability, support for ancillary applications (sometimes referred to as "apps") such as, for example, calendars, email, maps and navigation, etc. Such ancillary applications may be pre-installed in a smart device or may be made available for download by a user. Certain such apps may comprise an ability to issue commands to entertainment and other appliances, for example in conjunction with a GUI offering the features and functionality of a universal remote control as known in the art, in conjunction with a TV guide display to enable channel selection, etc. Typically such remote control apps may be provisioned with a library of command data and protocols suitable for controlling a plurality of appliances of different type and/or manufacture (a so-called "universal remote"). Such a command library and the hardware necessary to transmit operational commands to appliances may be incorporated into or made available to the smart device itself, or may take the form of a separate external device which is placed in communication with the smart device (i.e., a relay device or so-called "blaster"). Regardless, upon initial installation or subsequent replacement of a controlled appliance such universal remote control apps must generally be configured to match each particular appliance to be controlled to an appropriate set of command data and a protocol in the library. Disclosed herein are user-friendly and convenient methods for conducting such a configuration process.

SUMMARY OF THE INVENTION

This invention relates generally to remote control systems and, more particularly, to a system and method for facilitating the set up and configuration of a portable device, e.g., a smart device which may incorporate universal remote control functionality, to command operation of one or more types of remotely controllable appliances of one or more manufacturers. Exemplary smart devices include but are not limited to Apple's "iPhone" and "iPad," Google's "Android" platform, Nintendo's "Wii U" controller, Blackberry's "Torch" or "PlayBook," etc. Exemplary types of appliances include, but are not limited to televisions, digital video disc players (DVDs), cable or satellite set top boxes (STBs), digital video recorders (DVRs), audio video (AV) receivers, thermostats, game consoles, lighting systems, etc.

In order to rapidly and conveniently configure a smart device app and associated command library to match the appliances to be controlled, in one exemplary embodiment of the teachings of the instant invention the smart device may be temporarily connected to an appliance to ascertain that appliance's identity and thereby determine appropriate command data and protocol for control of that appliance. When said appliance is in communication with other remotely controllable appliances to form part of a local entertainment and/or environmental system, the identities of those other appliances may also be determined by the smart device, using the connected appliance as an agent. In a second exemplary embodiment of the teachings of the instant invention, the smart device may communicate with an appliance which has previously participated in the set up of another universal remote control in order to receive from that appliance the configuration settings arrived at during that previous set up process.

Additionally, in some embodiments configuration information regarding said local system may be communicated to the smart device by the agent appliance for use in the creation of activity macros; for use in localization of smart app displayed labels and menus; etc. Such information may comprise, by way of example, data regarding which media source appliances are attached to which input ports of a rendering device such as a TV monitor or AV receiver, thereby facilitating the creation of pre-configured smart device command sequences for use in initiating activities such as "Watch TV", "Listen to Music"; language and menu settings of the connected appliance(s); etc.

In one exemplary embodiment, the physical and logical interconnections between smart device and appliance, and amongst appliances, may be in accordance with the High Definition Media Interface (HDMI) specification and appliance identities may be derived from, inter alia, Consumer Electronic Control (CEC) or Extended Display Identification Data (EDID) data retrievable from appliances in compliance with that specification, and/or from Source Product Description (SPD) information frames embedded in a source appliance digital video stream in accordance with the Consumer Electronics Association specification CEA-861. However, it will be appreciated that other interconnection methods and/or protocols such as, by way of example without limitation USB, IEE1394 "Firewire", UPnP, CEbus, etc. may be utilized to the same end, when appropriate for a particular embodiment.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1A:
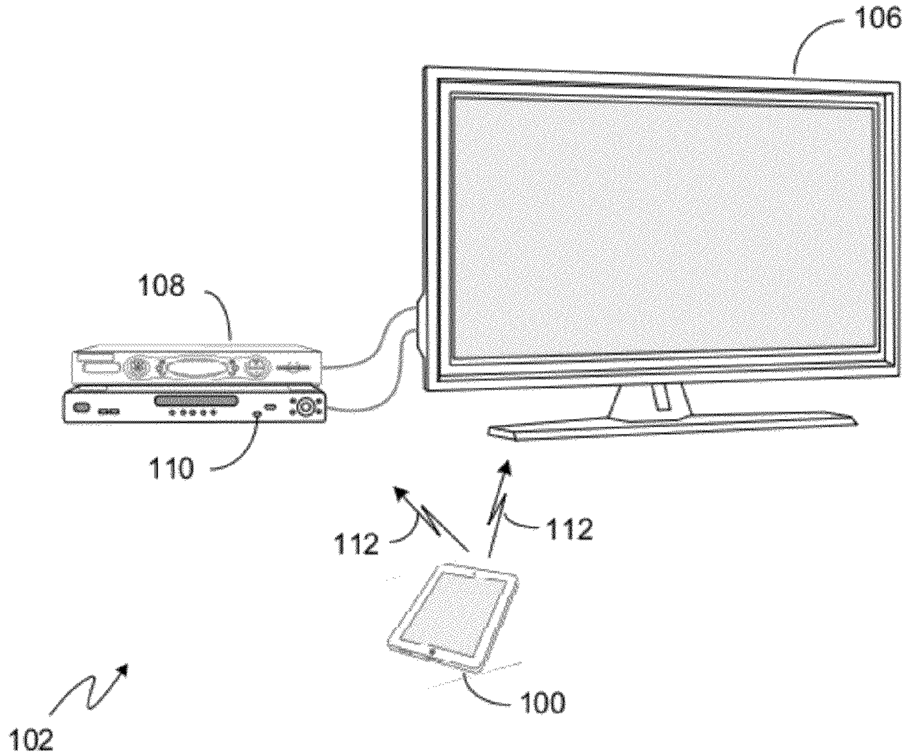
FIGS. 1*a* and 1*b* illustrate exemplary systems in which a smart device app configured in accordance with the instant invention may be utilized.
Figure 1B:
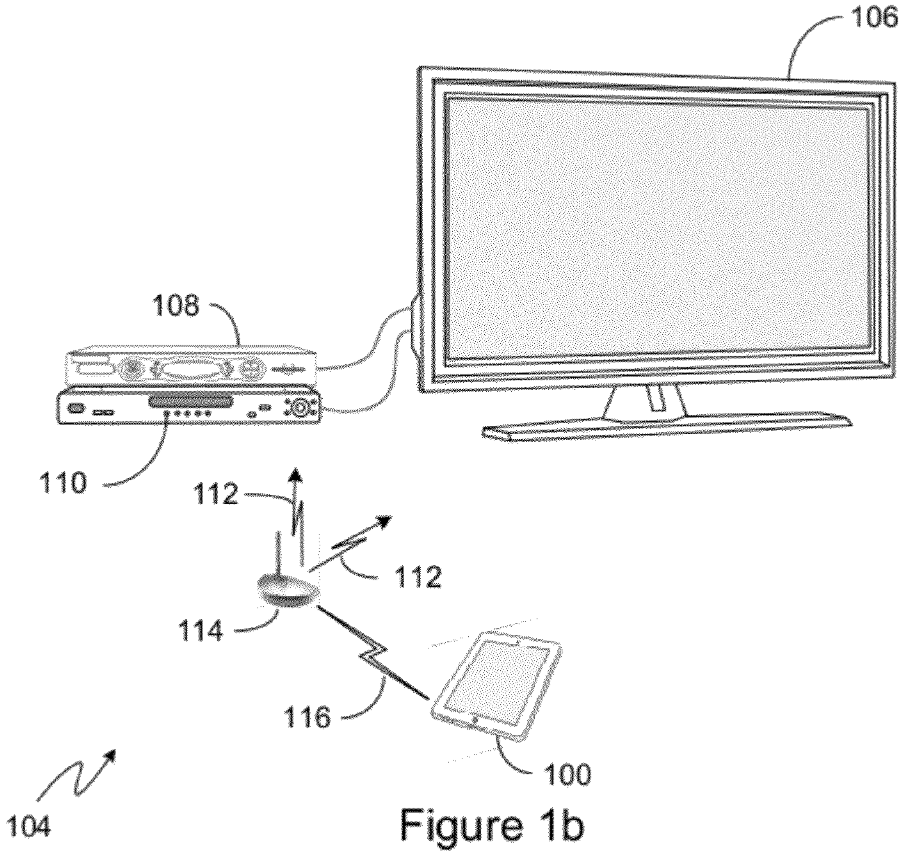

By way of example, FIGS. 1*a* and 1*b* illustrate exemplary systems 102 and 104 wherein a smart device 100 may be adapted to issue commands to controllable appliances such as a TV 106, set top box (STB) 108, DVD player 110, etc. While illustrated in the context of a home entertainment system comprising a TV, STB, and DVD player, it is to be understood that controllable appliances may include, but need not be limited to, televisions, VCRs, DVRs, DVD players, cable or satellite converter set-top boxes ("STBs"), amplifiers, AV receivers, CD players, game consoles, home lighting, drapery, fans, HVAC systems, thermostats, personal computers, etc. In the illustrative example of FIG. 1*a*, a smart device 100 may include both a universal remote control app and the necessary hardware to enable direct transmission of commands to appliances 106 through 110. Appliance commands may be issued in the form of infrared signals 112 as illustrated, or in any other suitable format, e.g., via an RF signal such as contemplated by RF4CE, Zwave, Bluetooth, etc.; ultrasonic signal; visible light; etc. as appropriate for the control of each particular appliance. In the example of FIG. 1*a* these command signals may be issued directly by smart device 102 using, for example, the technology described in co-pending U.S. patent application Ser. No. 13/043,915 which is incorporated herein by reference in its entirety. In an alternative embodiment illustrated in FIG. 1*b*, appliance commands 112 may be issued indirectly via a relay device 114 which is responsive to wireless communications 116 received from the universal remote control app resident in smart device 100, for example as described in co-pending U.S. patent application Ser. No. 13/071,661, also incorporated herein by reference in its entirety.

In either case, the remote control app and/or associated relay device must be provisioned with the specific command data and protocol (a "codeset") to which each of the to-be-controlled appliances is responsive. As is known in the art, this may take the form of a pointer or index into a library of codesets pre-stored locally in the memory of smart device 100 or of relay device 114; individual codesets downloaded to those devices during a configuration process; an item-by-item download of individual codeset command codes on an as-required basis from a library stored locally on a PC or on an appliance such as STB 108 or TV 106, or stored remotely at a headend or internet accessible server; etc. Regardless, since the methods described herein to accomplish the identification of suitable codesets for controlled appliances may be generally applied without regard to the exact mechanisms by which said codesets are finally provisioned, it is to be understood that the embodiment described hereafter is by way of example only, and the techniques presented may pertain, mutatis mutandis, to any of the various possible equipment and code library configurations.

Figure 2:
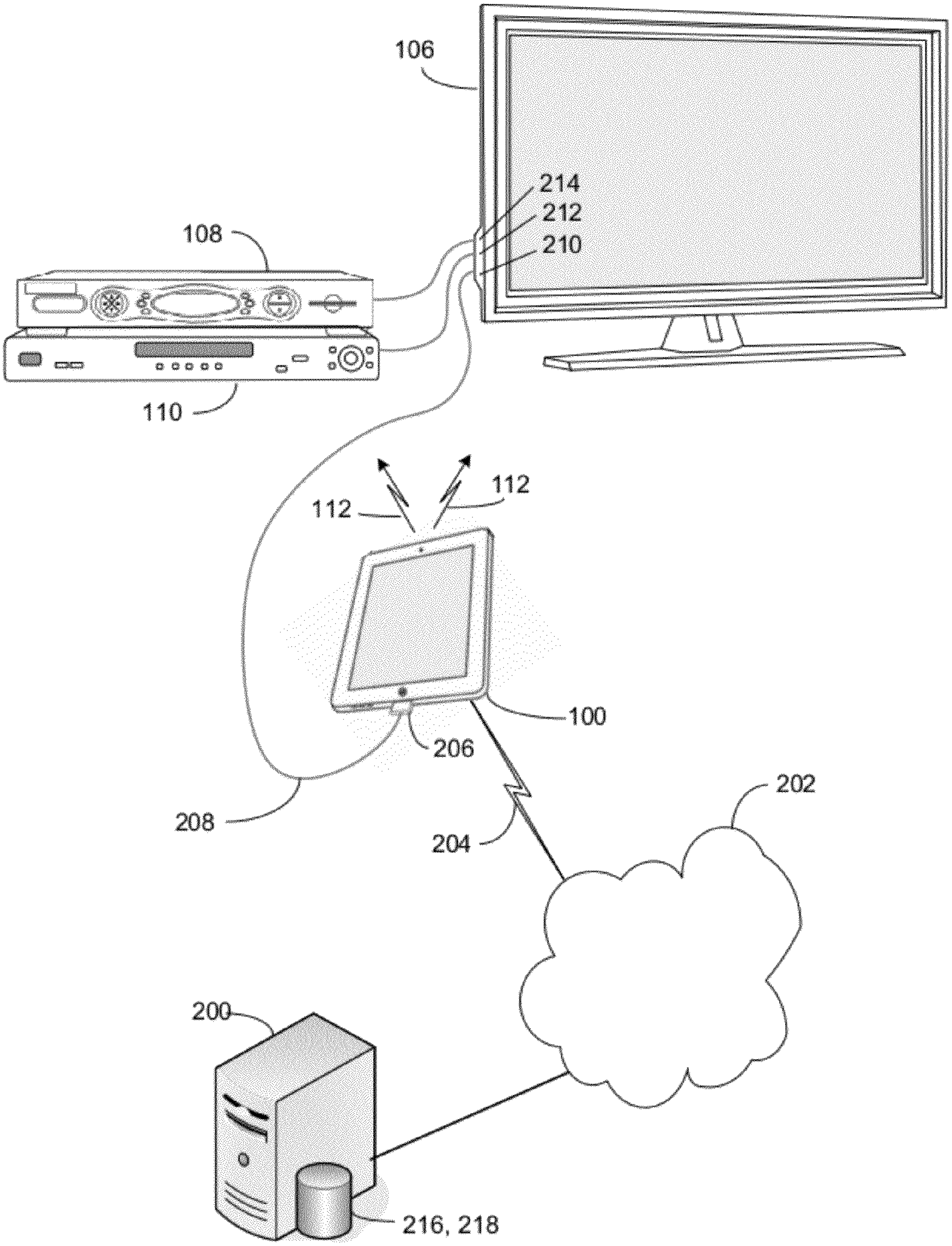
FIG. 2 illustrates exemplary interconnections which may be used during configuration of the smart device(s) of FIG. 1 in accordance with a first embodiment of the invention.

With reference to FIG. 2, in one exemplary embodiment a remote control app resident on a smart device 100 may be matched to the appliances to be controlled, for example a TV set 106 and/or a cable STB 108 and DVD player 110 by temporarily connecting an HDMI port 206 of smart device 100 to an available HDMI port 210 of an appliance to be controlled, e.g., TV 106 in the illustrative example, via an HDMI compatible cable 208. Once the connection is established, the remote app of smart device 100 may be placed into a setup mode in which mode the app may solicit device identification data from TV 106 such as, for example a CEC manufacturer ID and/or an EDID manufacturer number and product code. In a preferred embodiment, the data so obtained may be uploaded from the smart device to a server 200 via, for example a WiFi connection 204 to the Internet 202. Server 200 may include a database 216 which cross-references CEC and/or EDID device identity data to appliance command codesets, which database may be referenced to determine an appropriate command codeset for control of exemplary appliance 106. In alternate embodiments, the database in which appliance command codesets are cross-referenced to data that is itself referenced according to a standard may be locally resident in the smart device itself; or may be resident in an appliance accessible as part of a WiFi network such as for example a local PC or STB. Regardless, once determined, the desired codeset may then be provisioned to the remote control app of smart device 100, in the form of a pointer or index into a local database; or in the form of a downloaded codeset block from a codeset database 218 stored on server 200; etc.; as appropriate.

Figure 3:
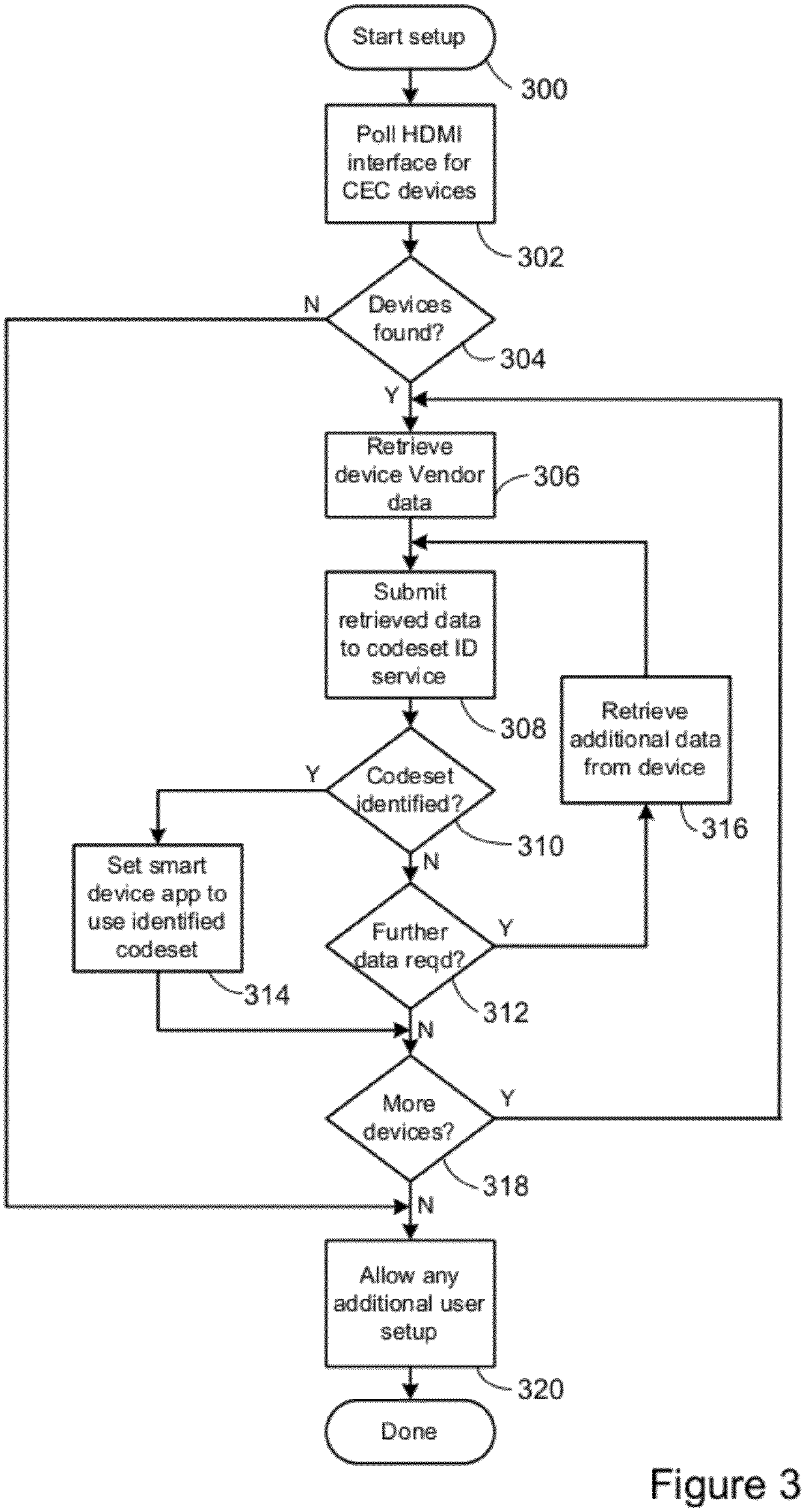
FIG. 3 illustrates a series of steps which may be performed by a smart device during an HDMI enabled setup process.

Turning now to the flowchart presented in FIG. 3, once an exemplary smart device 100 has been attached to an appliance using HDMI cable 208, at step 300 a setup program which forms part of a remote control app installed on that smart device may be initiated, for example from a configuration or settings menu as is well known in the art. At step 302, the setup program may commence by issuing successive CEC compatible <Polling Message> transmissions (as defined in the HDMI specification and accompanying CEC supplement) to each of the possible type-specific CEC logical device addresses. By way of explanation, the CEC protocol may support up to 16 possible logical address values, with each value allocated to a particular appliance type: For example, a TV device may only assume logical address zero or 14; a playback device such as a DVD player may only use one of logical addresses 4, 8 or 11; a tuning device may only use one of logical addresses 3, 6, 7 or 10; etc. For purposes of receiving responses to a poll, the initiating device (smart device 100 in this example) in accordance with one version of the CEC specification may always assume address 15. Though smart device 100 is physically connected only to HDMI port 210 of TV 106, the CEC protocol allows for an appliance to act as a CEC Switch, i.e., to transparently route CEC communications to/from appliances connected to its other HDMI ports, such as STB 108 or DVD player 106 in the illustrative example. Accordingly in those instances where this functionality is supported by the host appliance to which the smart device is tethered, the setup program may be thereby enabled to interrogate downstream appliances.

If no device responses to the issued polling messages are detected at step 304 the setup program continues at step 320 to allow manual configuration by a user of the app. If, however, one or more responses are detected, at step 306 a CEC <Give Device Vendor ID> message is transmitted to the first responsive logical address value. In accordance with the CEC protocol, the appliance to which this message is directed may respond with a unique 24-bit vendor ID, which number is assigned to CEC-compliant manufacturers by the IEEE in accord with the standard. Upon receipt, at step 308 this vendor ID number, together with the CEC logical address from which it originated (being indicative of appliance type), may be forwarded by the setup program to a codeset identifier, for example a Web service resident on server 200.

Upon receiving a response from the codeset identifier service, at steps 310 and 312 the setup program may determine if the response constitutes a positive identification of a codeset for use in issuing commands to the indicated appliance, or if it comprises a request for additional information by way of disambiguation. If neither, it is assumed that the identifier service has failed to identify a suitable codeset, and the setup program continues at step 318 to determine if additional appliances remain to be identified. If the received response comprises a request for additional disambiguation information, such information may be retrieved at step 316 and forwarded to the codeset identification service for further processing. By way of example without limitation, such disambiguation data requests may be for Extended Display Identification Data (EDID) as specified by the Video Electronics Standards Association (VESA), retrievable from display devices via the HDMI interface and which may for example includes data fields corresponding to a Microsoft-assigned manufacturer ID and/or a manufacturer-assigned product code; for a response to a <Get Menu Language> CEC request (which may be indicative of a territory/market in which the appliance is currently installed); for responses to <Give OSD Name> or <Get CEC version> CEC requests; for retrieval of SPD data corresponding to an input HDMI port of the host appliance (i.e. TV 106 of the illustrative example) where such retrieval is supported by the host appliance; etc.; as appropriate for a particular embodiment or appliance. By way of explanation regarding SPD data, CEA standard CEA-861B specifies that a digital video source may optionally insert a periodic Source Product Description information frame into its output video stream. This "InfoFrame" may comprise a seven byte ASCII vendor name, a sixteen byte ASCII product description such as a model number, and a one byte binary product type identifier (e.g., 01h is a digital STB, 02h is a DVD player, 05h is digital video camera, etc.) Rendering devices such as TV 106 may optionally decode this data and use it to augment on-screen menu displays, etc.

Alternatively or in addition to the above, since CEC-compliant appliances are required to issue a <Feature Abort> response to any message relating to an unsupported feature, in some embodiments a codeset identification service may request that certain CEC transmissions be initiated to an appliance and the resulting response(s) reported, to allow exact identification of an appliance by verification of its support for certain features (or lack thereof).

If the received response is determined at step 310 to be indicative of the identity of an appliance control codeset, then at step 314 the remote control app of smart device 100 may be configured accordingly. As is known in the art, such configuration may take the form of storing a pointer to, or index into a preloaded local library of command codesets, provision of the required codeset as a data download from a server based codeset library 218, etc., as appropriate for a particular embodiment. Once configuration is completed, at step 318 the setup program next determines whether additional appliances remain to be identified. If so, processing returns to step 306 to repeat the above identification process for the next appliance. Once all appliances which responded to the polling request of step 302 have been subjected to the identification process, the setup continues at step 320, where additional user input may be solicited as necessary. Such user input may comprise, for example, provision of explicit model number information and/or codeset numbers, etc., to complete the identification and configuration of any appliances which were not responsive to the CEC polling request, which could not be uniquely identified by the automated codeset identification service, etc., after which the initial configuration of the remote control app of smart device 100 is complete. Since the various alternative methods for identification of appliance command codesets are well known in the art, for the sake of brevity these will be discussed further herein.

Figure 4:
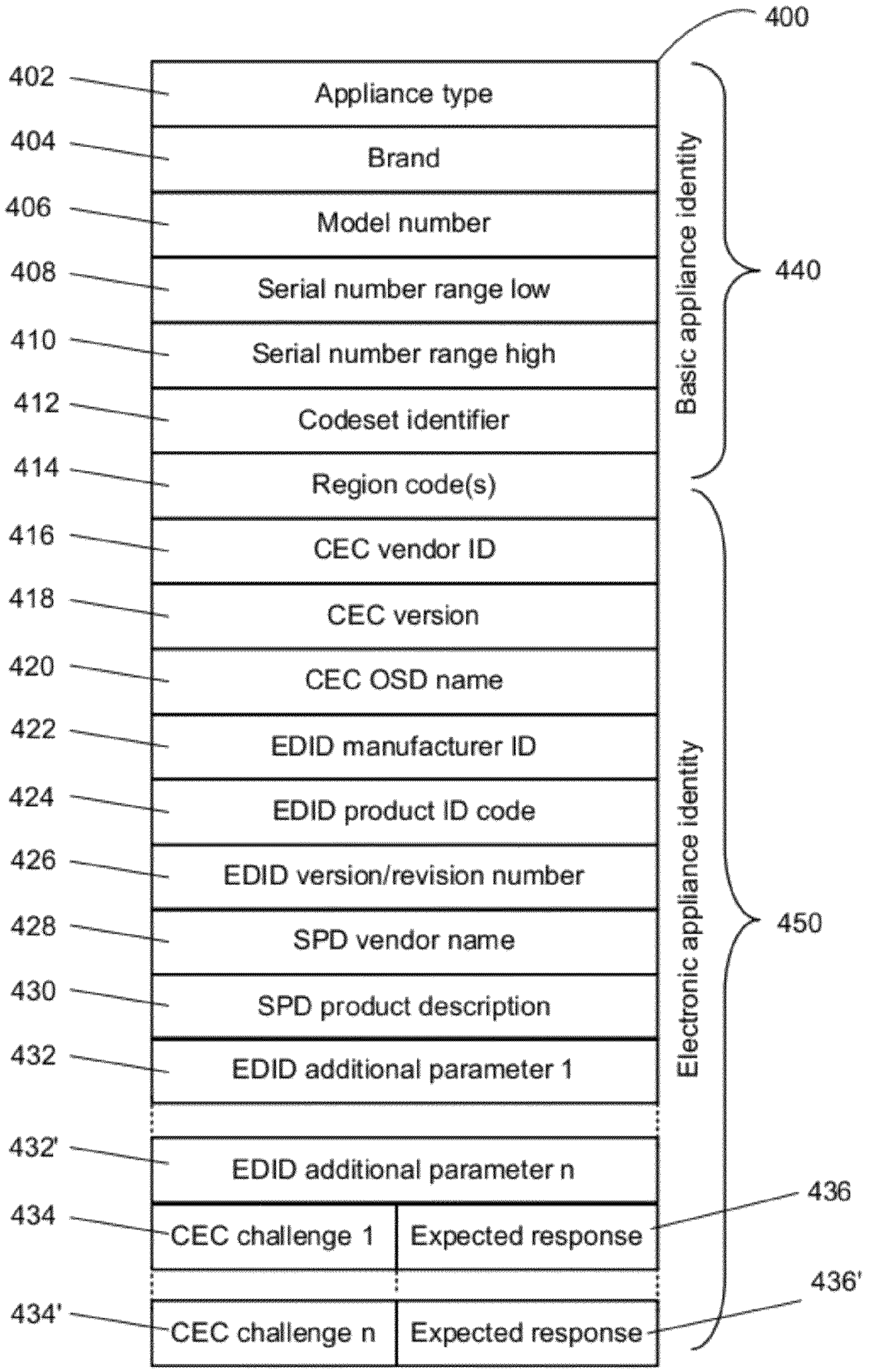
FIG. 4 illustrates an exemplary appliance identity database record which may be utilized in configuring a smart device app in accordance with this invention.

With reference now to FIG. 4, an exemplary embodiment of an appliance identification database 216 may comprise a group of records 400, one for each distinctly identifiable appliance, each record comprising a series of fields 402 through 436' as illustrated. In the example presented, each appliance record 400 may include a basic appliance identity 440 which may comprise data fields such as appliance type 402, brand 404, model number 406, serial number or date range 408,410 (where necessary to ensure unique identification, for example where a manufacturer has changed an appliance feature in the middle of a model run) and the identifier 412 of an appliance command codeset for use in commanding operation of the appliance. In some instances, geographic or market region codes 414 may also form part of the basic appliance identity. The information comprising this basic appliance identity may be utilized in various prior art methods for configuring controlling devices to command operation of the appliance, for example matching a user provided brand and model number, printing set up code lists to be published in manuals, sequentially testing codesets corresponding to a particular appliance type and brand (and sometimes region), etc., all as well known in the art.

In addition to the above basic appliance identity data, an exemplary appliance identification database record 400 in accordance with the instant invention may include additional fields 416 through 436' which comprise a second, electronic, identity 450 for the same appliance. Such an electronic identity may comprise a tabulation of data items which may be solicited electronically from the appliance, for example via the HDMI interconnection 208 of the illustrative embodiment. This data may include without limitation a CEC vendor ID 416, a CEC version 418, a CEC OSD name 420, an EDID manufacturer ID 422, an EDID product code 424, an EDID version/revision number 426, an SPD vendor name 428, and an SPD product description 430. In some embodiments, geographic region codes 414 may also form part of an electronic appliance identity, since these may be derivable from CEC <Get Menu Language> responses. It should also be noted that, due to practices such as private labeling, multi-sourcing, etc., the vendor/manufacturer ID and name fields 416, 422, and 428 are not necessarily synonymous with each other or with brand field 404.

Where necessary to ensure a unique identity for an appliance, additional data fields may be part of an appliance identity record 400. These may include for example further EDID discernable parameters 432 through 432', such as video formats and resolutions supported, timing data, etc., and/or CEC challenge/response data fields 434,436. Such challenge/response fields may comprise an electronic command or query 434 to be issued to an appliance together with an expected response 436 to be returned by the appliance. By way of example without limitation, to distinguish between similar cable STBs which differ only by the presence or absence of a DVR option, a CEC <Give Deck Status> request may be issued in the expectation that the non-DVR STB response will be a CEC <Feature Abort> message. If necessary to ensure accurate identification of a particular appliance, multiple challenge/response data fields 434',436' may be provided.

In the illustrative embodiment, with the exception of appliance type 402 and codeset identifier 412, data fields which are not applicable or not available for a specific appliance may be set as "null". For example, serial number range fields 408,410 may not be necessary, certain appliance types may not support EDID, etc.

In order to uniquely identify an appliance, an illustrative appliance identification service resident on and/or associated with server 200, for example, implemented by instructions stored on a non-transient, computer readable media accessible by the server 200, and interacting with an exemplary smart device set up app which operates generally in accordance with the logic previously described in connection with the flowchart of FIG. 3, may receive an initial communication from smart device 100 comprising a CEC vendor ID together with an indication of appliance type (e.g., the CEC logical address from which that vendor ID was retrieved.) The appliance identification service may apply those values as a mask to select only those records 400 of database 216 which match the requested criteria, i.e., a match in field 402 with the appliance type implied by the CEC logical address value retrieved from an appliance and a match in field 416 with the CEC vendor ID retrieved from the appliance. It will be appreciated that in various embodiments the data content of this initial communication may comprise other values, such as for example an SPD vendor name and product description, in place of or in addition to the values mentioned above, in which case the selection mask may be adjusted accordingly. If only a single match results, the identification is complete and the corresponding codeset identifier value from field 412 of that record may be returned to the setup app resident in smart device 100. If, however, multiple records meet the selection criteria the appliance identification service may then examine the contents of these records to determine which data field in that remaining subset exhibits the greatest diversity. Once the determination is made, a request for the retrieval of that data item from the appliance may be forwarded to the setup app resident in smart device 100. When the requested data item is returned by the app, this item may be added to the selection mask and the selection process repeated. In event that a requested item is not available, for example the current host appliance does not support SPD decoding and SPD data has been requested, the smart device setup app may respond in the negative in which case the currently requested item may be eliminated from the appliance identification matching process and a new request issued for an alternative data item. These steps may be iterated until either a single database record remains and its codeset identifier 412 can be communicated to the setup app; or no further selection criteria are available, i.e., every field 414 through 436' has either been utilized or been found to contain a null value, in which case a failure may be communicated to the smart device setup app, allowing it to initiate a user message suggesting that an alternative set up method be employed.

Once fully provisioned with the command codesets necessary for control of a consumer's appliances, in certain embodiments a smart device remote control app in accordance with the instant invention may undergo additional customization while in physical communication with the controlled appliances via the exemplary HDMI connection. In one embodiment, the response(s) to a CEC <Get Menu Language> request may be utilized to adjust the menus, key labels, etc., of the remote control app to match those in use by the controlled appliances. Conversely, upon consumer request the language to which the smart device is currently regionalized may be conveyed to the controlled appliances via a CEC <Set Menu Language> request, thereby adapting the appliance displays to match the user preference settings of the smart device.

In instances where an appliance such as TV 106 is adapted to perform the beforementioned CEC switching function and is equipped to support such a query, that switching appliance may be requested to indicate which of its physical HDMI ports (e.g. 210 thru 214) are associated with which downstream CEC logical addresses (e.g., STB 108, DVD player 110, etc.) The data so acquired may then be utilized by a smart device remote control app to configure activity macros, for example without limitation "Watch TV" or "Watch a movie", such that a command to select the appropriate HDMI input of TV 106 will be automatically issued when the activity is initiated. Such macro configuration may be completely automatic, or may require user input: For example where multiple media playback appliances are detected in a configuration (e.g., both a DVD player and Vudu streaming video on demand box) a user may be prompted to select which appliance is to be used for a "Watch movie" activity (it being understood that in cases such as this multiple "Watch movie" activities may also be configured). To facilitate user identification of the desired appliance, the prompt may include the appliances self-provided identities retrieved using CEC <Get OSD name> requests, appliance brand names and/or model numbers supplied by a codeset identification service, TV input port numbers, or any combination thereof as appropriate.

Figure 5:
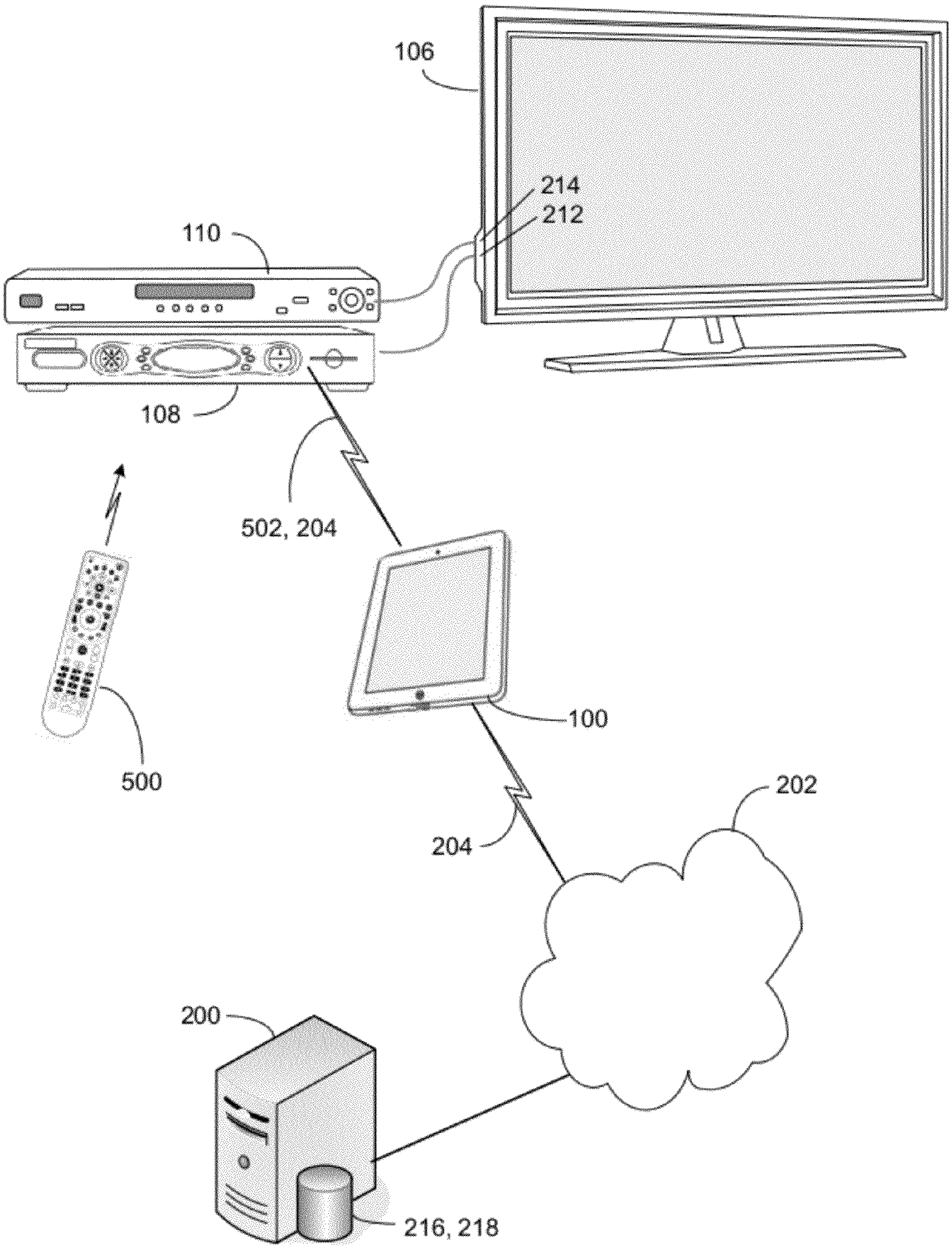
FIG. 5 illustrates a further exemplary system in which configuration of the smart device(s) of FIG. 1 may be accomplished in accordance with a second embodiment of the invention.
Figure 6:
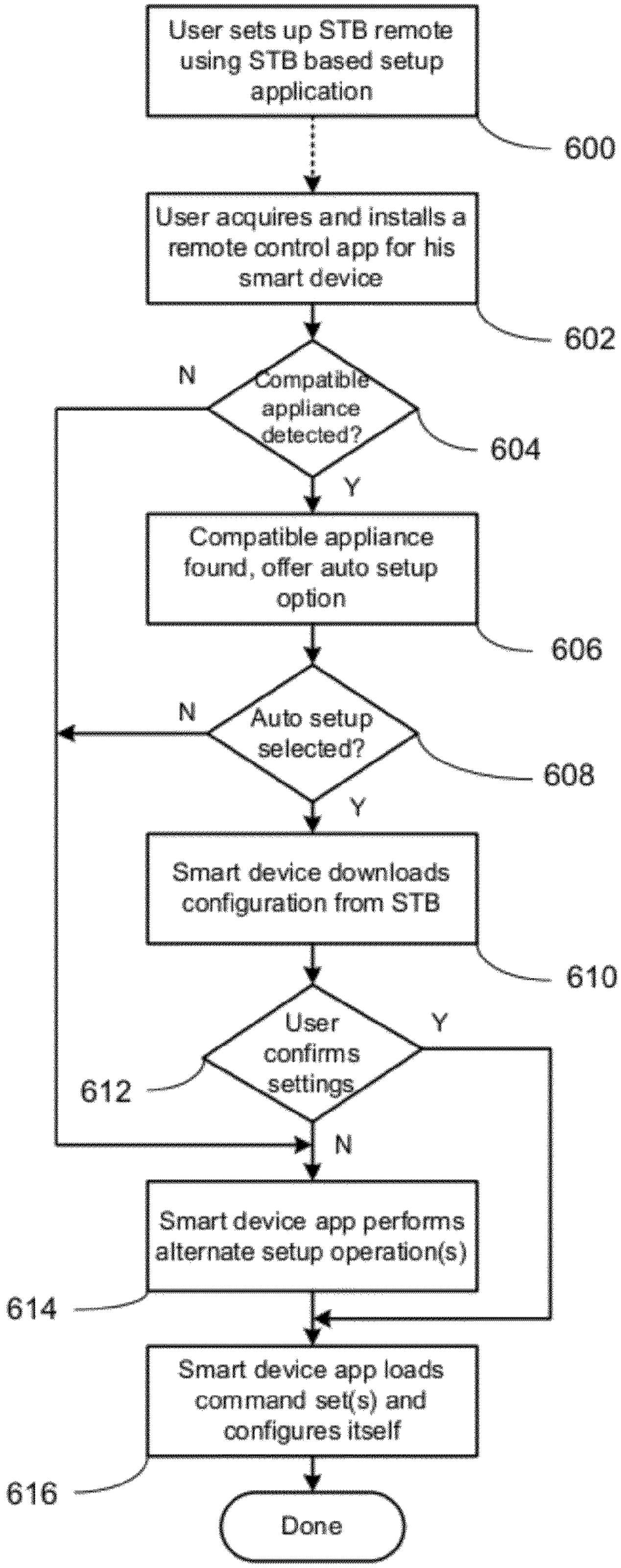
FIG. 6 illustrates a series of steps which may be performed by a smart device during an appliance enabled setup process.

Turning now to FIG. 5, in an alternate embodiment a remote control app resident in smart device 100, i.e., computer executable instructions stored on a tangible readable media, may interact with an appliance such as STB 108 to retrieve from that appliance the codeset identities which had been previously been determined during set up of a conventional universal remote control 500 supplied in conjunction with that appliance, e.g., STB 108. Such codeset identities may for example comprise information regarding the command data and protocols suitable for control of TV 107 and DVD player 110. With reference to FIG. 6, in an exemplary method for accomplishing configuration of a smart phone remote control app, at step 600 a user may initially configure a universal remote control 500 using an interactive application resident in STB 108, for example as described in U.S. Pat. No. 7,969,514 and U.S. patent application Ser. No. 13/026,768, the disclosures of which are incorporated herein by reference in their entirety and of which this document constitutes a continuation-in-part. Upon completion of the set up of remote control 500 in accordance with the teachings of those disclosures, the identities of the codesets to be utilized by remote control 500 in commanding the operation of, for example TV 106 and DVD player 110, are known to and may be stored within STB 108.

Subsequently, at step 602 a user may acquire and install a remote control app for a smart device, desirous of using that app to command the operation of the appliances of the system of FIG. 5. In accordance with the teachings of this invention, at step 604 such a smart device app may determine if a compatible STB appliance is present in the user's equipment configuration, e.g., an appliance such as STB 108 which has previously conducted an interactive setup, stored codeset identities, and is capable of communicating these to smart device 100. Such discovery and communication may for example be via a wireless connection 502, using WiFi 204, Bluetooth, or any other protocol as convenient for a particular embodiment. The discovery of a compatible appliance(s) may occur automatically, e.g., when the smart device is initially invoked; may occur upon initial user configuration of the smart device app to command the operation of the compatible appliance (e.g. STB 108); may be manually initiated by a user; etc.; or any combination thereof as appropriate. If no compatible appliance is detected at step 604, the method may continue at step 614 to perform alternate configuration of the smart device app using methods such as those described previously herein or any other suitable appliance command set identification method as known in the art.

If however a compatible appliance is detected, at step 606 the smart device app may offer a user the option of automatically configuring the app to command the operation of the balance of the user's appliances. If the user declines, the app continues with the alternate configuration methods of step 614. If the user accepts, at step 610 the smart device may retrieve from the compatible appliance, e.g., STB 108, the codeset identities applicable to the other appliances for which universal remote control 500 has been set up to command the operation of Once these identities have been retrieved and loaded into the smart device, in some embodiments at step 612 a listing of the appliances to be added the smart device app configuration may be displayed for user confirmation. As will be appreciated, such a listing may comprise the codeset identifiers themselves, brand names and/or model numbers associated with those identifiers (which may be included in the data retrieved from STB 108; cross referenced in a database stored locally in smart device 100; retrievable from a remote database 216,218; or any combination thereof). Once the user has confirmed the desired configuration, at step 616 the smart device may configure itself to command operation of the selected appliances, for example as previously described in connection with step 314 of FIG. 3. Additionally, in certain embodiments, in place of any of the methods of step 314 one or more of the appliance codesets (i.e. command data and protocol information) may be downloaded directly from STB 108 itself.

While various concepts have been described in detail, it will be appreciated by those skilled in the art that various modifications and alternatives to those concepts could be developed in light of the overall teachings of the disclosure. For example, while the illustrative equipment configuration presented above utilizes a television set as the HDMI interconnection focal point and host appliance for attachment of a smart device, or an STB for retrieval of previously-configured remote control settings, it will be appreciated that in alternate configurations another device such as an AV receiver, a PC, a game console, etc. may serve equally well as a host appliance or retrieval source to which a smart device may be temporarily attached or with which a smart device may communicate for set up purposes. Furthermore, in those instances where no appliance in the configuration is capable of supporting CEC switch functionality, it will also be appreciated that a smart device in accordance with the invention may nevertheless be individually attached to multiple appliances in sequence in order to perform an electronically-enabled setup. It will also be appreciated that in certain embodiments, for the sake of efficiency multiple appliance-identifying data items may be gathered and jointly forwarded to an appliance identification service as a single transaction, rather than in a step-by-step fashion as described above. Additionally, while illustrated using an HDMI connection, CEC protocol, and EDID and SPD InfoFrame data values it will be appreciated that various other connectivity and appliance identification data gathering methods may be equally adaptable to the purposes described herein; standards may evolve or be amended to support additional features; etc., and that accordingly the exemplary appliance identification database contents presented herein are by way of illustration only and not intended as an exhaustive tabulation of all possible identification data points or parameters that are or may become available for utilization by the appliance identification methods described herein.

While described in the context of functional modules and illustrated using block diagram and/or flowchart formats, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for configuring a smart device to command functional operations of a target appliance, comprising:

retrieving at the smart device from a controllable appliance in connection with a controllable appliance discovery process invoked on the smart device data indicative of a codeset identity of the target appliance wherein the codeset identity was determined during a process used to configure a conventional universal remote control to command functional operations of the target appliance and wherein the process used to configure the conventional universal remote control is performed in cooperation with the controllable appliance; and using the data indicative of the codeset identity retrieved from the controllable appliance by a remote control application resident on the smart device to also configure the smart device to command functional operations of the target appliance.

2. The method as recited in claim 1, wherein the controllable appliance comprises a settop box.

3. The method as recited in claim 1, wherein the remote control application resident on the smart device uses the data indicative of the codeset identity to select a codeset from a library of codesets stored locally in the smart device.

4. The method as recited in claim 1, wherein the remote control application resident of the smart device uses the data indicative of the codeset identity to initiate a retrieval of a codeset from a library of codesets stored in a device located remotely with respect to the smart device.

5. The method as recited in claim 1, wherein the data indicative of the codeset identity comprises a codeset associated with the target appliance.

6. The method as recited in claim 1, wherein the controllable appliance comprises an application which causes instructions to be displayed for the purpose of assisting a user in performing steps to configure the conventional universal remote control to control functional operations of the target appliance.

7. The method as recited in claim 6, wherein the instructions are caused to be displayed on a television and wherein the television comprises the target appliance.

8. The method as recited in claim 1, wherein the remote control application is downloaded onto the smart device via a network connection.

9. The method as recited in claim 1, wherein the data indicative of the codeset identity is retrieved from the controllable appliance via a RF communication channel.

10. The method as recited in claim 9, wherein the smart device issues commands to control functional operations of the target appliance via an IR communications channel.

11. The method as recited in claim 1, wherein retrieval of the data indicative of the codeset identity is automatically initiated by the smart device.

12. The method as recited in claim 1, wherein the remote control application on the smart device uses the data indicative of the codeset identity to display on the smart device information indicative of the identity of target appliance for allowing confirmation that configuration of the smart device to command functional operations of the target appliance is to proceed.

13. The method as recited in claim 12, wherein the remote control application displays a brand name and/or model number associated with the data indicative of the codeset identity.

14. A non-transitory computer-readable media having stored thereon instructions for configuring a smart device to command functional operations of a target appliance, wherein the instructions perform steps comprising:

causing data indicative of a codeset identity of the target appliance to be retrieved by the smart device from a controllable device in connection with a controllable appliance discovery process invoked on the smart device wherein the codeset identity was determined during a process used to configure a conventional universal remote control to command functional operations of the target appliance and wherein the process used to configure the conventional universal remote control is performed in cooperation with the controllable appliance; and using the data indicative of the codeset identity retrieved from the controllable appliance to also configure the smart device to command functional operations of the target appliance.

15. The computer-readable media as recited in claim 14, wherein the data indicative of the codeset identity is used to select a codeset from a library of codesets stored locally in the smart device.

16. The computer-readable media in claim 14, wherein the data indicative of the codeset identity is used to initiate a retrieval of a codeset from a library of codesets stored in a device located remotely with respect to the smart device.

17. The computer-readable media as recited in claim 14, wherein the data indicative of the codeset identity comprises a codeset associated with the target appliance.

18. The computer-readable media as recited in claim 14, wherein retrieval of the data indicative of the codeset identity is automatically initiated.

19. The computer-readable media as recited in claim 14, wherein the instructions use the data indicative of the codeset identity to display on the smart device information indicative of the identity of target appliance for allowing confirmation that configuration of the smart device to command functional operations of the target appliance is to proceed.

20. The computer-readable media as recited in claim 19, wherein the remote control application displays a brand name and/or model number associated with the data indicative of the codeset identity.

* * * * *